United States Patent
Jackson et al.

[11] Patent Number: 5,969,246
[45] Date of Patent: Oct. 19, 1999

[54] APPARATUS AND METHOD FOR DETERMINING AXIAL STABILITY

[75] Inventors: David A. Jackson, Los Gatos; Donald J. Christian, Fremont; Hoshang Shroff, Cupertino, all of Calif.; Bernie F. Jackson, Glenbrook, Nev.

[73] Assignee: Snap-On Technologies, Inc., Lincolnshire, Ill.

[21] Appl. No.: 08/965,032

[22] Filed: Nov. 5, 1997

Related U.S. Application Data

[63] Continuation-in-part of application No. 08/544,378, Oct. 10, 1995, Pat. No. 5,724,743
[60] Provisional application No. 60/052,026, Jul. 9, 1997.
[51] Int. Cl.⁶ .................................................. G01B 11/275
[52] U.S. Cl. ........................... 73/459; 33/288; 33/203.18; 356/155
[58] Field of Search .......................... 73/1.79, 146, 459; 33/203.18, 288, 336, 337; 356/155

[56] References Cited

U.S. PATENT DOCUMENTS

| | | | |
|---|---|---|---|
| 3,974,699 | 8/1976 | Morris et al. | 73/510 |
| 4,180,915 | 1/1980 | Lill et al. | 33/288 |
| 4,854,168 | 8/1989 | Himmler | 73/459 |
| 4,899,218 | 2/1990 | Waldecker et al. | 33/288 |
| 5,143,400 | 9/1992 | Miller et al. | 280/661 |
| 5,435,193 | 7/1995 | Halliday | 73/862.541 |
| 5,535,522 | 7/1996 | Jackson | 33/288 |
| 5,684,698 | 11/1997 | Fujii et al. | 280/840 |
| 5,724,743 | 3/1998 | Jackson | 33/288 |

Primary Examiner—Richard Chilcot
Assistant Examiner—Eric S. McCall
Attorney, Agent, or Firm—Claude A.S. Hamrick

[57] ABSTRACT

An apparatus and method for determining axial stability compares measured wheel runout and axial instability parameters with prescribed tolerances to determine if the wheel suffers from excessive wheel play. Axial stability and runout is determined and displayed on a monitor screen such that an alignment technician can quickly assess both the degree of present wheel misalignment and the feasibility of attempting to perform a realignment operation without first repairing worn or damaged suspension parts. The attitude and location of a wheel are measured with the wheel set in a first position to determine a first vector having a predetermined relation to the wheel. The wheel is rolled back a number of degrees to a second position and the attitude and location thereof are measured to determine a second vector also having the predetermined relation to the wheel. Rearward axis parameters including a rearward rotational axis vector and a rearward runout vector are determined based on the first and second vectors. The wheel is rolled forward to a third position which is substantially equal to the first position and the attitude and location of the wheel are measured to determine a third vector also having the predetermined relation to the wheel. Forward axis parameters, including a forward rotational axis vector and a forward runout vector, are determined based on the second and third vectors. Dynamic stability vectors including a rotational axis stability vector and a runout stability vector are determined based on the forward and rearward axis parameters.

36 Claims, 16 Drawing Sheets

APPARATUS AND METHOD FOR DETERMINING AXIAL STABILITY

APPARATUS AND METHOD FOR DETERMINING AXIAL STABILITY

This application is a continuation-in-part of U.S. Ser. No. 08/544,378, filed Oct. 10, 1995, now U.S. Pat. No. 5,724,743 entitled "METHOD AND APPARATUS FOR DETERMINING THE ALIGNMENT OF MOTOR VEHICLE WHEELS" and this application claims priority under 37 C.F.R. § 1.78 to the Provisional Application, Ser. No. 60/052,026 filed Jul. 9, 1997 and entitled "AXIAL STABILITY INSPECTION DEVICE AND METHOD".

BACKGROUND OF THE INVENTION

1. Field of the Invention

The present invention pertains to a method and apparatus for determining wheel runout and axial stability of the wheels of a motor vehicle. More specifically, the present invention pertains to a method and apparatus for measuring axial stability of vehicle wheel systems and for determining whether or not the wheel suspension and associated mechanisms of a vehicle fall within predetermined tolerances such that alignment is feasible without prior repair or replacement of parts.

2. Terms and Definitions

"Camber" is the angle representing the inward or outward tilt from true vertical of a wheel. Camber is positive if the top of the wheel tilts outward.

"Geometric center line" is the line that runs from a point on the rear axle midway between the rear wheels to a point on the front axle midway between the front wheels.

"Toe" is the angle formed by a front to back line through the wheel compared to the geometric center line. Traditionally, Camber and Toe measurements for a wheel are relative measurements i.e. relative to a vertical plane or to another wheel.

"Roll" is the angle measured about a true axis of the wheel.

3. Description of the Prior Art

Proper maintenance of a motor vehicle typically includes a periodic wheel alignment diagnostic test in order that proper tire wear and safe handling may be achieved. However, many vehicles that are brought into a shop for alignment inspection actually have more serious suspension problems that cannot be corrected by simple realignment. If any of the wheels of the vehicle are seriously out of alignment, excessive or uneven wear of the tires can result and adversely affect the handling and stability of the vehicle. In addition to simple misalignment, a vehicle may have some degree of runout or wobble which indicates that the plane of the wheel is not precisely perpendicular to its axis of rotation. Such problems may be caused by defective bearings, a defective or damaged suspension system, or a defective, worn, or damaged steering system. Numerous devices and systems for determining the alignment of motor vehicle wheels are well known and used throughout the world to facilitate the alignment of wheels supported by a myriad of types of suspension systems.

However, if a vehicle wheel exhibits excessive runout, suspension play, or wheel play, the use of instruments mounted on the wheels may not produce an accurate alignment reading unless compensation is provided. Methods for determining compensation for runout of a wheel of a vehicle are well known and typically include interval measurements of position and orientation of a wheel as it is moved through a series of predetermined positions displaced from a known starting position. The measurement values are then processed to determine angular relations which yield runout characteristics that can be factored into the alignment operations. It is possible to determine and compensate for some wheel play when aligning a vehicle wheel. But, if the wheel suffers from excessive wheel play, then realignment of the wheels is useless.

SUMMARY OF THE INVENTION

It is therefore an object of the present invention to provide a system for determining wheel runout and axial stability of a vehicle as a means for determining whether or not it is feasible to realign the vehicle wheels without first repairing or replacing suspension components. The system compares measured wheel runout and axial instability parameters with prescribed tolerances to determine if the wheel suffers from excessive wheel play. Another object of the present invention is to provide a method and apparatus for determining and displaying the degree of axial stability exhibited by the wheels and suspension of a vehicle under test. Still another object of the present invention is to provide a method by which an opto-electronic wheel alignment detection system may be used to prequalify a vehicle as to whether or not a simple realignment operation is feasible.

Briefly, a presently preferred embodiment of the present invention includes the provision of an apparatus and method by which axial stability and runout can be determined and displayed on a monitor screen in a way such that an alignment technician can quickly assess both the degree of present wheel misalignment, if any, and the feasibility of attempting to perform a realignment operation without first repairing worn or damaged suspension parts. In addition to including means for measuring positional characteristics of the vehicles wheels so they are moved between several positions and developing corresponding electrical signals corresponding thereto, means responsive to the measured signals is provided for analyzing the signals and driving a visual display that will indicate to the technician the nature, direction, and degree of the stability of each vehicle wheel under inspection.

Among the advantages of the present invention is that it provides a means that at a glance indicates which if any wheel of the vehicle under test is out of tolerance. Another advantage of the present invention is that it provides an apparatus and method that is largely automatic and requires minimal physical activity and cognitive effort on the part of a technician during the initial test procedure. These and other objects and advantages will no doubt become apparent to those skilled in the art following a reading of the following disclosure of a preferred embodiment that is illustrated in the several figures of the accompanying drawing.

IN THE DRAWING

DETAILED DESCRIPTION OF THE PREFERRED EMBODIMENTS

Figure 1A:
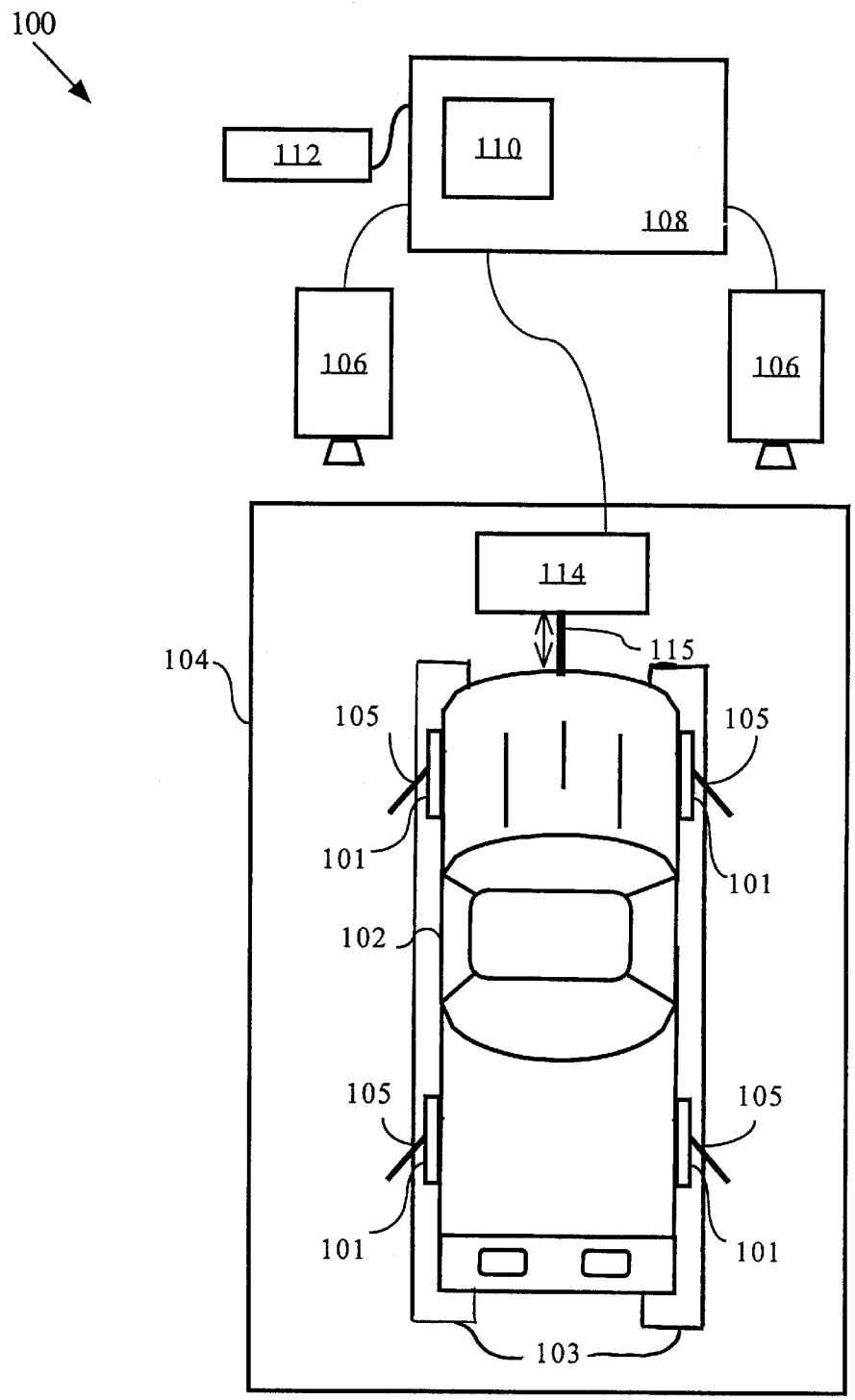
FIG. 1A is a block diagram generally illustrating a system for characterizing axial stability and wheel runout of the wheels of a vehicle in accordance with the present invention.

The present invention provides a method and apparatus for determining rotational axial stability and wheel runout of a rotating object such as a vehicle wheel and for indicating whether such characteristics are within certain predetermined tolerances.

There are many known systems for determining the position and attitude of a rotating object such as a vehicle wheel. U.S. Pat. No. 5,535,522 (Jackson) is incorporated herein by reference as a disclosure of one such system. The Jackson system determines the alignment of vehicle wheels based on precise electro-optical measurements of the position and attitude of each wheel made by optically inspecting objects mounted to the wheels and performing highly accurate calculations relating dimensional characteristics of geometrical features provided on the objects to corresponding reference data.

FIG. 1 is a block diagram illustrating at 100 an opto-electronic system for measuring and characterizing axial stability and wheel runout of the wheels 101 of a vehicle 102 using the above referenced Jackson system in accordance with the present invention. As depicted, vehicle 102 is mounted on a vehicle supporting means that might include for example a lift rack 103 supported by a shop floor 104 as further described below, and a target assembly 105 having a defined pattern or shape is affixed to each wheel of the vehicle.

The opto-electronic system at 100 includes two optical sensing means 106 each having an interface to an electronic processing means 108. In the depicted embodiment, each of the optical sensing means 106 is a camera, and the processing means 108 is a computer system. Processing means 108 preferably includes a visual display means 110 and an operator interface or input means 112 such as a keyboard or remote input device. Readings and diagnostic advice are displayed graphically and textually on display means 110 as described in the referenced Jackson patent. Processing means 108 also includes data storage means for storing predetermined automotive dynamic stability tolerance data including prescribed wheel-play tolerance data for wheel runout and rotational axis stability.

Each of the optical sensors 106 can view at least one target assembly 105 mounted on a wheel 101 and form an image thereof as viewed from the perspective of the sensing means. Electronic signals corresponding to the images are transferred to processing means 108 which correlates the detected perspective image of each target with the known true shape and orientation of reference data. In so doing, processing means 108 relates the perceived dimensions of certain known geometric elements on each target with the orientation and dimensions of corresponding reference data. In this manner, the system can determine the position and attitude of each wheel of vehicle 102. Although the Jackson system provides an example of an opto-electronic system for determining position and attitude of a vehicle, there are a variety of other well known methods for determining the position and attitude of a wheel which could likewise be used with the method of the present invention for determining axial stability and wheel runout.

An actuator means 114 may optionally be provided and attached to the lift rack 103 by a connecting linkage 115 to move the vehicle back and forth under control of processing means 108. Actuator means 114 may include an electrical motor and a lead screw, a hydraulic cylinder and arm, or any other suitable actuator means which is computer controllable. The actuator is coupled to receive control signals from processing means 108 and in turn controls the magnitude and direction of movement of vehicle 102.

Figure 1B:
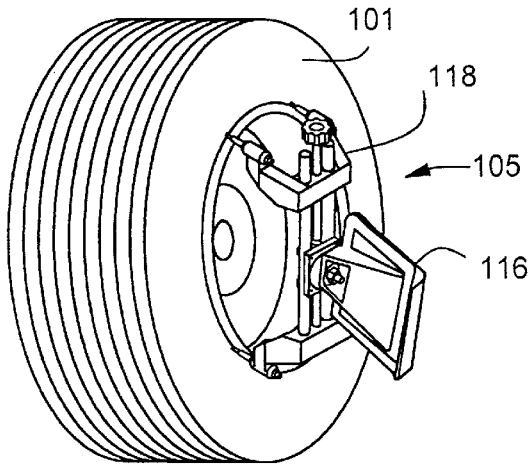
FIG. 1B is a perspective view illustrating a target assembly including a target plate affixed to a wheel of the vehicle shown in FIG. 1A.

FIG. 1B is a perspective view illustrating one of the target assemblies 105 affixed to a vehicle wheel. The assembly includes a target plate 116 which is affixed to wheel 101 by a rim clamp 118 such that the position and attitude of the wheel will have a predetermined relationship to plate 116 so that such characteristics may be determined from the electro-optically detected position and attitude of target plate 116.

Figure 1C:
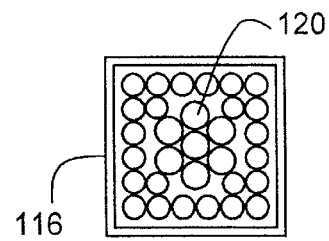
FIG. 1C is an elevational view illustrating an exemplary pattern printed on the target plate shown in FIG. 1B.

FIG. 1C shows an elevational view of an exemplary target pattern 120 printed or otherwise disposed on the face of plate 116. In a preferred embodiment of the present invention, pattern 120 includes several different sized circles arranged in a predetermined format with the locii of the circle center points precisely positioned relative to each other. The geometric relationships of the pattern allow for precise position and attitude measurements of the plate 116, and because it bears a precise and predetermined relationship into the wheel rim, it permits accurate measurements of the disposition of wheel 101 (FIG. 1B).

Figure 1D:
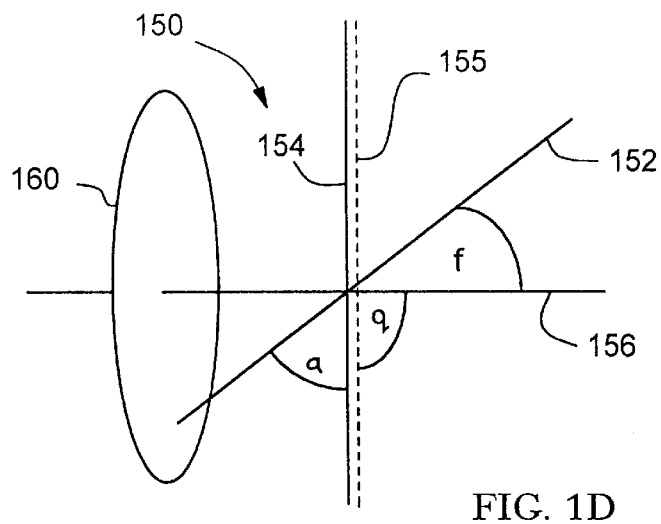
FIG. 1D is a diagram illustrating a fixed coordinate system for referencing position and attitude of a vehicle wheel in accordance with the present invention.

FIG. 1D shows a coordinate system at 150 defining a frame of reference for determining rotational axial stability and runout of a vehicle wheel in accordance with a preferred embodiment of the present invention. The frame of reference includes a camber axis 152, a Toe axis 154, and a Roll axis 156, the roll axis being assumed to be normal to a rim plane 160 and passing through the center thereof.

A Camber angle q represents rotation about camber axis 152. Camber angle q represents the inward or outward tilt from a true vertical line 155. Camber angle q, which is measured between Roll axis 156 and true vertical line 155, is positive if the top of rim plane 160 tilts outward. A Toe angle f represents rotation about Toe axis 154. Toe angle f, which represents the angle formed by a front to back line through the wheel compared to a geometric center line of a vehicle, is measured between Roll axis 156 and Camber axis 152. A Roll angle a represents rotation about Roll axis 156. Roll angle a, which represents the angle formed by a point on the wheel about a true axis of the wheel, is measured between Camber axis 152 and Toe axis 154.

Figure 1E:
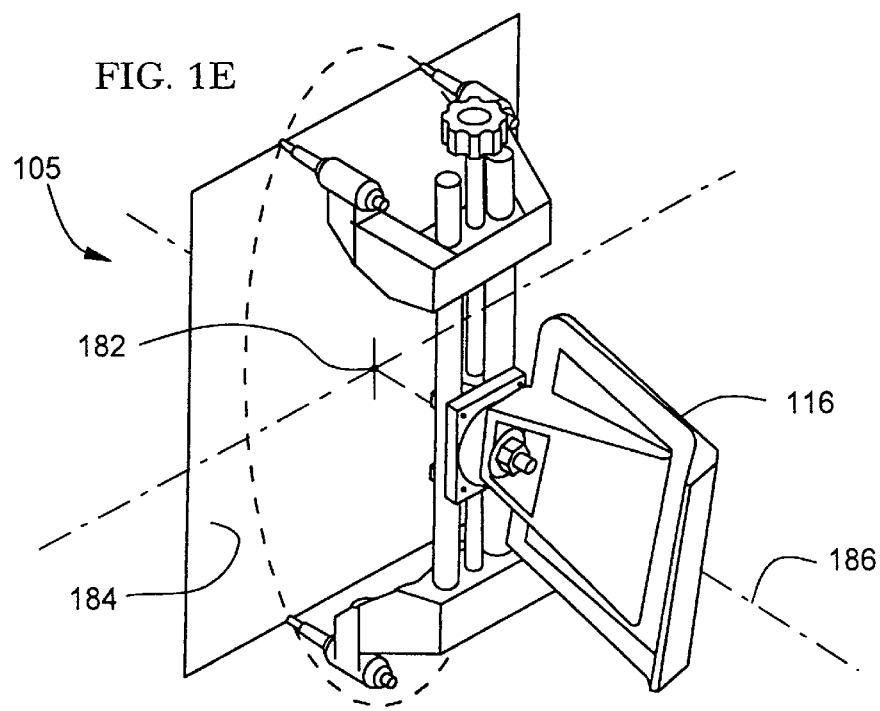
FIG. 1E is a diagram further illustrating geometric characteristics of the target apparatus of FIG. 1B.

FIG. 1E depicts an enlarged perspective view further illustrating the geometric characteristics of target assembly 105. A claw normal line 186 passing through a known point on the target is constructed normal to claw plane 184 and intersects claw plane 184 at a claw datum zero point 182.

With target assembly 105 mounted on a wheel, the position of the wheel may be correlated to the position of target assembly 105 which may be characterized by a claw normal vector which defines the attitude and location of the target assembly. The claw normal vector is defined by the position coordinate, (X, Y, Z), of claw datum zero point 182 and the attitude, (camber, toe, roll), of the claw normal line 186 of target assembly 105. A claw normal vector may be expressed as; (X, Y, Z, Camber, Toe, Roll).

Figure 2:
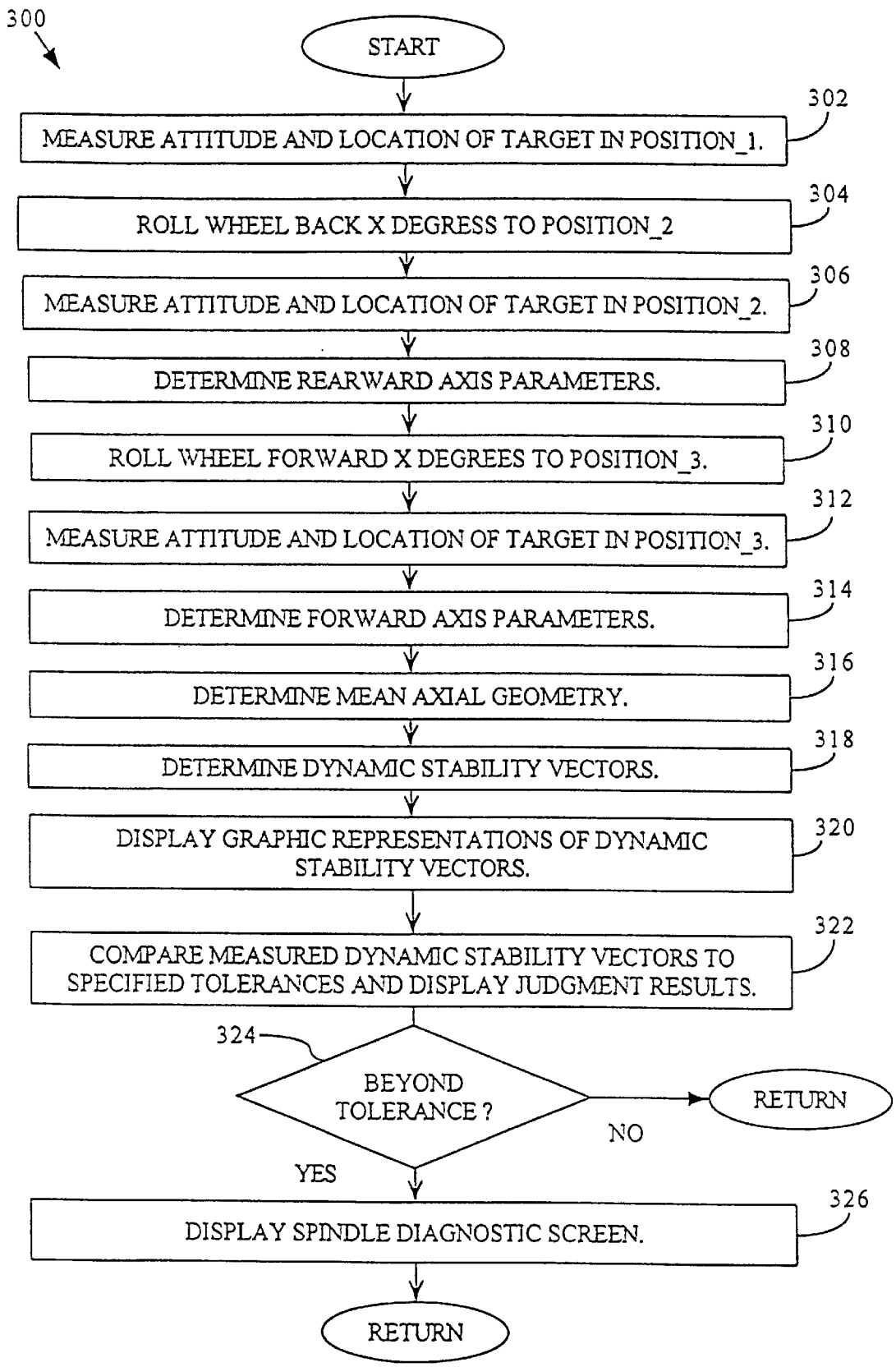
FIG. 2 is a flow diagram illustrating a process in accordance with the present invention for determining and characterizing rotational axial stability and wheel runout of a vehicle wheel.

FIG. 2 shows a diagram illustrating geometric characteristics of one of wheels 101 (FIG. 1A) as vehicle 102 is rolled from a first position, position__1, to a second position, position__2, and then back to a third position, position__3 which is in close proximity to the first position, positiona__1.

Figure 3:
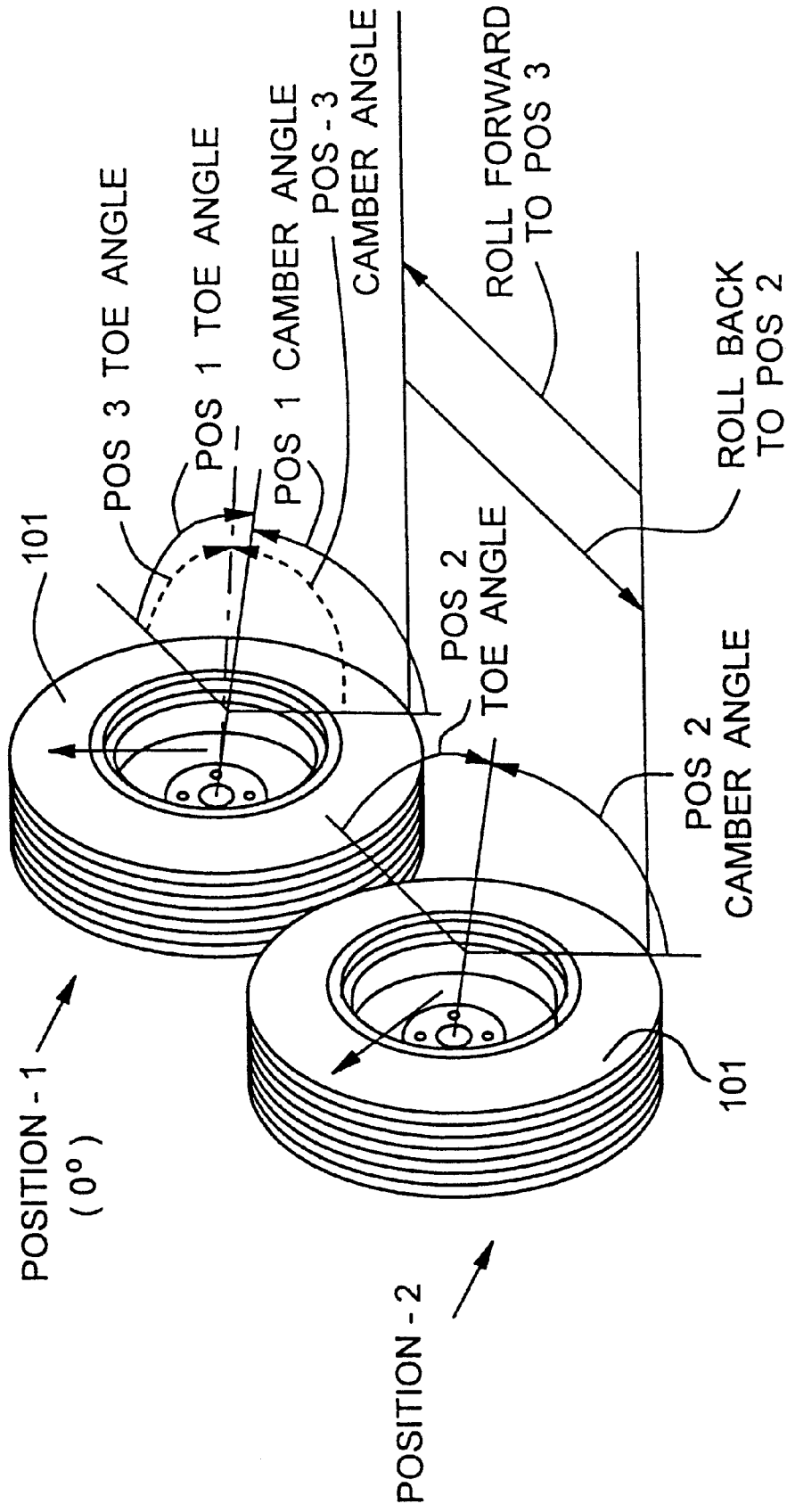
FIG. 3 is a diagram illustrating geometric characteristics of a vehicle wheel as the vehicle is rolled from a first to a second position and then back to a third position in accordance with the present invention.

FIG. 3 shows a flow diagram at 300 of an axial stability determination process for determining rotational axial stability and runout of a vehicle wheel in accordance with the present invention. The number of wheels to be tested depends on the type of service to be performed on the vehicle. For purposes of brevity and clarity, the stability determination process is described with respect to a single wheel. However, is understood that this process is normally performed on more than one wheel, and typically all the wheels of the vehicle.

In accordance with the present invention, the vehicle is moved through a wheel positioning sequence in which it is rolled back a few centimeters from a first position to a second position and then rolled forward from the second position back to a third position. The opto-electronic system makes target position and attitude measurements as the vehicle is posed in each position and processing means 108 (FIG. 1A) geometrically processes the measured position and attitude parameters of the wheel to determine axial stability and wheel runout. The system thus evaluates spindle geometry for evidence of significant deviations from predetermined design parameters such as manufacturer wheel data tolerances.

An operator initiates the axial stability determination process by activating the opto-electronic system 100 (FIG. 1A) which then instructs an operator, via display means 110, to perform a necessary setup procedure before beginning the process. The system may instruct the operator to: (1) set the vehicle 102 in a first position on vehicle support means 104; (2) couple connecting linkage 115 to vehicle 102 (if the system is automatically actuated); and (3) mount a target assembly 105 on each wheel.

In step 302, the opto-electronic system determines the attitude and location of the target assembly 105 with the wheel set in the first position, Position__1 (FIG. 2). A first claw normal vector, which defines the attitude and location of target assembly in the first position, is characterized by the position coordinate (X1, Y1, Z1) of claw datum zero point 182 and the attitude (Camber1, Toe1, Roll1) of the target's claw normal line 186 (FIG. 1E) while the wheel and target are in the first position.

When the attitude and position measurements corresponding to the first position, are complete, the system rolls the vehicle or displays a graphical message via display means 110 to prompt the operator to roll the vehicle to a second position, position 2 (FIG. 2).

In step 304 of the process, the vehicle is rolled from the first position to the second position wherein the roll angle, i.e. angular difference between the first and second positions is a number, X, of degrees which is preferably between 30 degrees and 45 degrees. In an automated embodiment of the invention, processing means 108 causes actuator means 114 to roll vehicle 102 to the second position. During this step, the system monitors the position of target assembly 105 and when it detects that the differential between the Roll angle of the first and current position is X degrees, processing means 108 controls actuator means 114 to stop rolling vehicle 102. In an alternative embodiment, during step 304, the system displays a graphical message via display means 110 instructing the operator to move the wheel back X degrees to the second position. In this embodiment, when system 100 detects that the Roll angle differential between the first position and the current position has changed by X degrees, a message is displayed to the operator via display means 110 to stop rolling the wheel.

In 306 (FIG. 3), system 100 measures the position and attitude of target assembly 105 in the second position, defined by a second claw normal vector including position coordinates, (X2, Y2, Z2), of the claw datum zero point 182 (FIG. 1E) and attitude coordinates, (Camber2, Toe2, Roll2), of the target's claw normal line 186 (FIG. 1E) while the wheel and target assembly 105 are in the second position.

In step 308, processing means 108 (FIG. 1A) determines rearward axis parameters which include a rearward rotational axis vector and a rearward runout vector based on the above described position and attitude measurements of the wheel in the first and second positions. Step 308 is implemented according to a rearward parameter determination process described below.

In step 310, the processing means instructs the operator, or causes actuator means 114, to roll vehicle 102 forward X degrees to the third position which is in close proximity to the first position. In step 312, the system measures the position and attitude of target assembly 105 while the assembly is in the third position characterized by a third claw normal vector defined by the position coordinate (X3, Y3, Z3) of the claw datum zero point 182 and the attitude, (Camber3, Toe3, Roll3), of the target's claw normal line 186.

In step 314, the processing means determines forward axis parameters including a forward rotational axis vector and a forward runout vector based on the above described position and attitude measurements of the wheel in the second and third positions. Step 314 is implemented according to a forward parameter determination process which is further explained below.

In step 316, the processing means determines mean axial geometry including a mean rotational axis stability vector and a mean wheel runout vector based on the forward and rearward axis parameters. In step 318, the processing means calculates dynamic stability vectors including a rotational axis stability vector and a runout stability vector. In step 320, graphic representations of the dynamic stability vectors determined in step 318 are displayed.

In step 322, the rotational axis stability vector and the runout stability vector are compared against predetermined runout and stability tolerances which are stored in memory modules of processing means 108. These tolerances may be specified by a manufacturer of the vehicle or may be customized based upon service experience. Results of this comparison yield a judgment which is displayed on display means 110 (FIG. 1A). If the results are within the prescribed tolerances, then the wheel is determined to have passed inspection. In a preferred embodiment of the present invention, the judgment is expressed in a color coding wherein green indicates an acceptable wheel condition and red indicates an unacceptable, or alarm, wheel condition.

If the runout and stability vectors are outside the predetermined runout and stability tolerances as determined in the decision step 324, the process proceeds to step 326 wherein the processing means displays a spindle diagnostic display on display means 110 (FIG. 1A). The spindle diagnostic display is further described below. If the runout and stability vectors are not beyond the predetermined runout and stability tolerances, the axial stability determination process returns to the start sequence.

Figure 4:
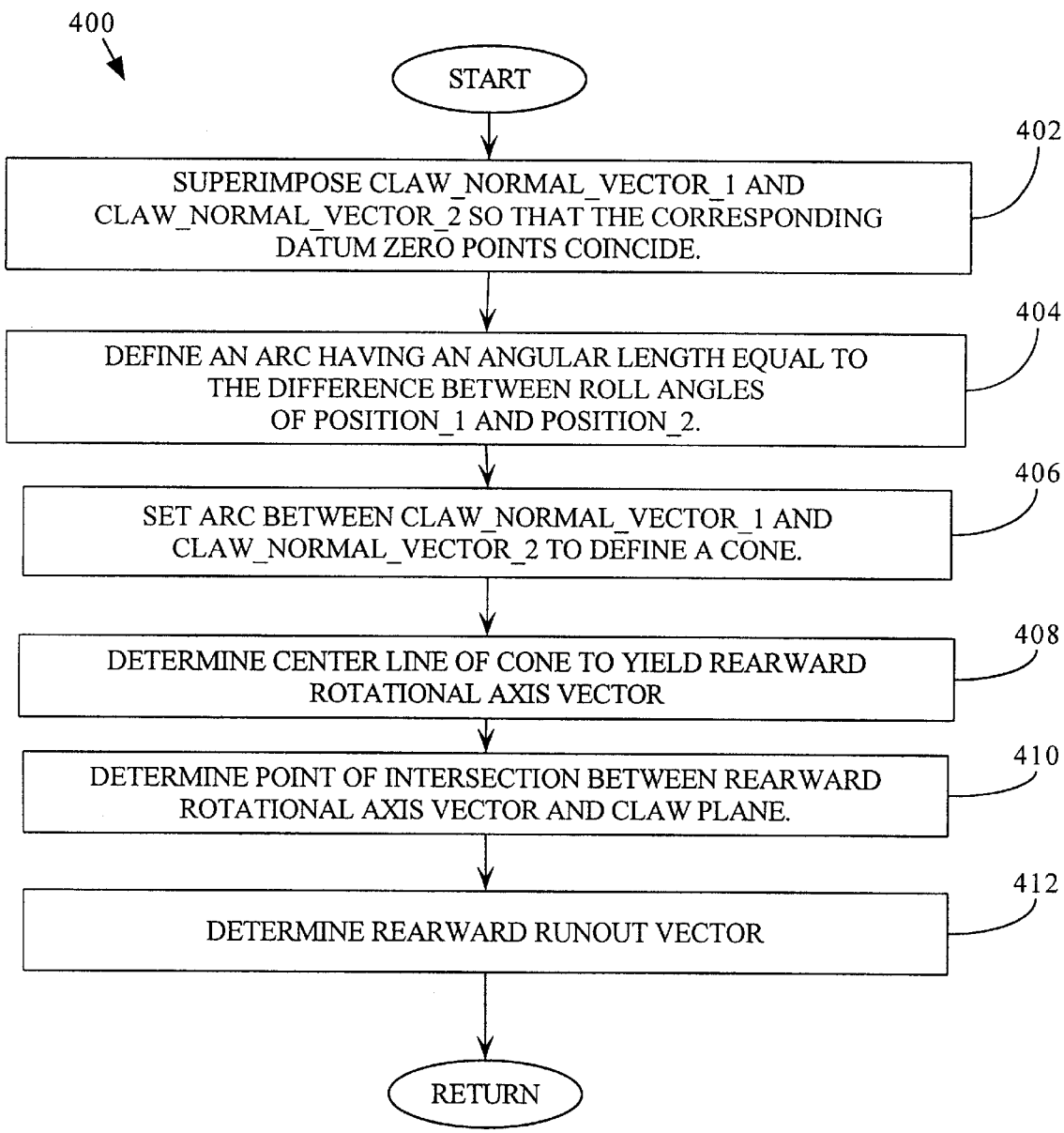
FIG. 4 is a flow diagram illustrating a rearward parameter determination process which yields a rearward rotational axis vector and a rearward runout vector in accordance with the present invention.

FIG. 4 is a flow diagram illustrating a rearward parameter determination process which yields a rearward rotational axis vector and a rearward runout vector in accordance with the previously mentioned step 308 (FIG. 3). The rearward parameter determination process 400 begins with step 402 in which the processing means 108 translates and superimposes the first claw normal vector and the second claw normal vector so that the corresponding first and second claw datum points coincide. In step 404, the processing means defines a rearward rotational arc having an angular length equal to the difference between the roll angles, Roll1 and Roll2, of the first and second claw normal vectors. The rearward rotational arc is determined according to well known geometric principles. In step 406, the processing means 108 sets the rearward rotational arc between the first and second claw normal vectors to define a rearward parameter cone again in accordance with well known geometric principles.

In step 408, the processing means determines a center line of the rearward parameter cone to yield a rearward rotational axis vector. In step 410, the processing means determines a rearward intersection point between the rearward rotational axis vector and the claw plane 184 (FIG. 1E) of the wheel. The rearward intersection point is used to define a translated claw normal line which intersects the rearward intersection point with a slope that is parallel to claw normal line 186 (FIG. 1E). In step 412, the processing means determines a rearward runout vector which is expressed relative to the rearward rotational axis.

Figure 5A:
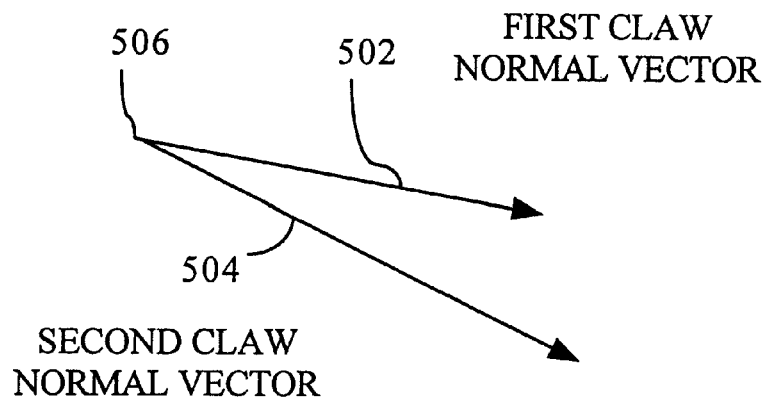
FIGS. 5A through 5D are vector diagrams illustrating the rearward parameter determination process illustrated by the flow diagram of FIG. 4.

FIGS. 5A through 5D show vector diagrams illustrating the rearward parameter determination process described above. FIG. 5A shows a vector diagram illustrating step 402 (FIG. 4) in which processing means 108 superimposes the first claw normal vector 502 with the second claw normal vector 504 so that the corresponding first and second claw datum points coincide at a point of coincidence (Xc, Yc, Zc) 506.

Figure 5B:
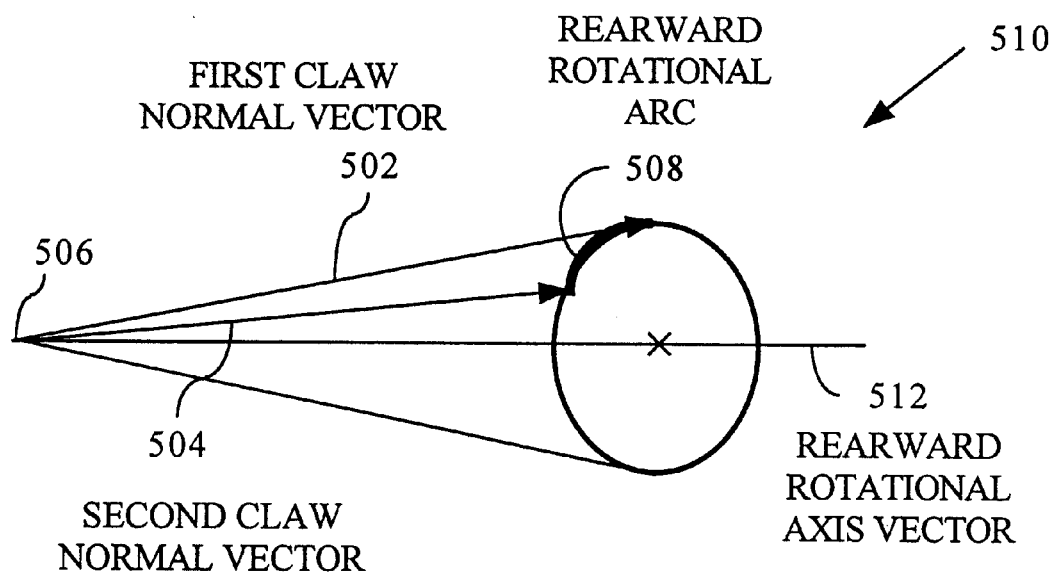

FIG. 5B shows a vector diagram illustrating step 404 (FIG. 4) in which processing means 108 determines a rearward rotational arc 508 which has an angular length equal to the difference between the roll angles, Roll1 and Roll2, of the first and second claw normal vectors 502 and 504. Rearward rotational arc 508 is set between first and second claw normal vectors 502 and 504 to define a rearward parameter cone 510 in accordance with step 406 (FIG. 4). A center line of cone 510 is determined in accordance with step 408 (FIG. 4) to yield the rearward rotational axis vector 512.

Figure 5C:
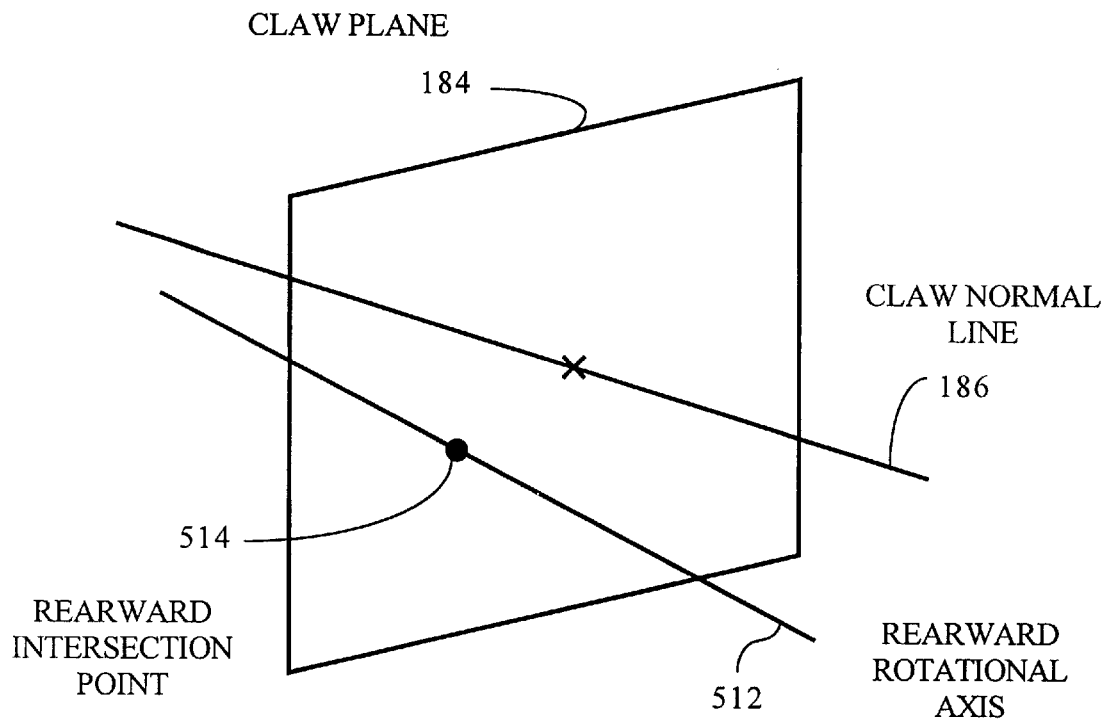

FIG. 5C shows a vector diagram illustrating step 410 (FIG. 4) in which processing means 108 determines the rearward intersection point 514 between rearward rotational axis vector 512 and the claw plane 184 of the wheel. Rearward intersection point 514 is determined and stored as (Xi1, Yi1, Zi1). Note that the claw plane 184 is not necessarily normal to the rearward rotational axis 512.

Figure 5D:
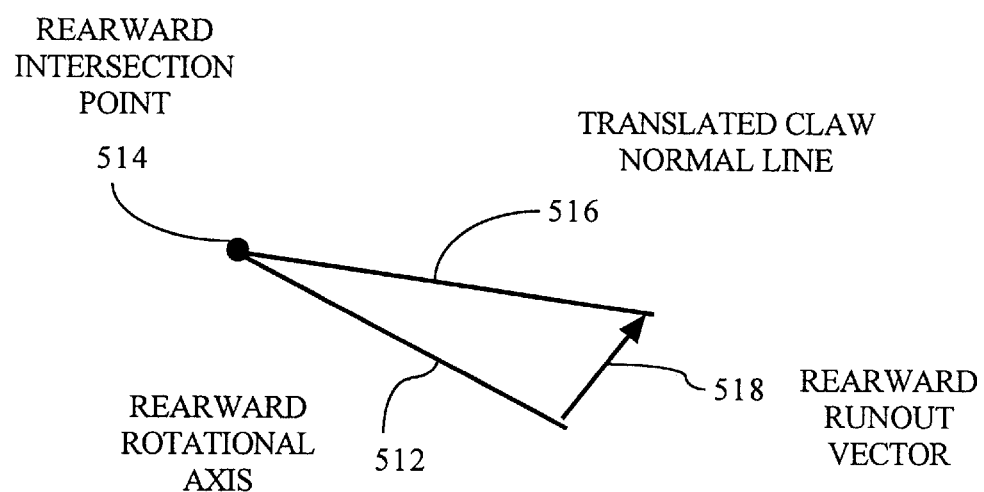

FIG. 5D is a vector diagram illustrating step 412 (FIG. 4) in which processing means 108 determines a rearward runout vector 518 which is expressed relative to rearward rotational axis 512. The magnitude of rearward runout vector 518 is set as the angular distance between claw normal line 186 (FIG. 5C), which is parallel to translated claw normal line 516, and rearward rotational axis 512. The direction of rearward runout vector 518 is expressed relative to the top of target assembly 105 (FIG. 1E), and thus remains constant regardless of the Roll angle of the wheel.

Note that if first claw normal vector 502 (FIG. 5B) and second claw normal vector 504 are coincident, then they are also identical with rearward rotational axis 512. In such case, rearward runout vector 518 (FIG. 5D) has an undefined direction and zero magnitude. Whenever the first and second claw normal vectors 502 and 504 (FIG. 5B) are not identical, then rearward runout vector 518 (FIG. 5D) has a unique non-zero solution.

Figure 6:
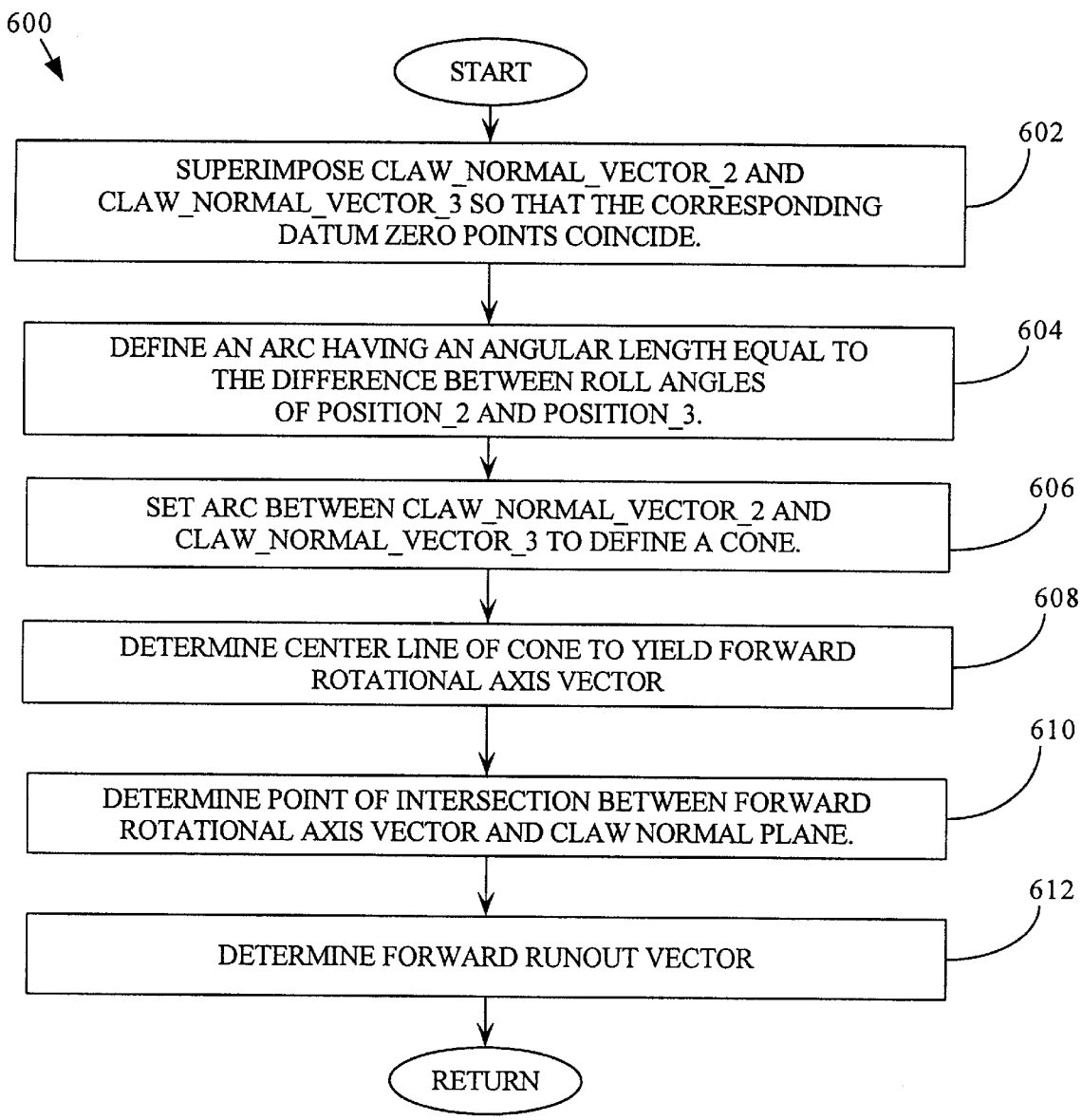
FIG. 6 is a flow diagram illustrating a forward parameter determination process which yields a forward rotational axis vector and a forward runout vector in accordance with the present invention.

FIG. 6 depicts a flow diagram at 600 illustrating a forward parameter determination process which yields a forward rotational axis vector and a forward runout vector in accordance with step 314 of the axial stability determination process 300 (FIG. 3). In step 602, processing means 108 superimposes the second and third claw normal vectors so that the corresponding second and third claw datum points coincide. In step 604, the processing means determines a forward rotational arc having an angular length equal to the difference between the roll angles, Roll2 and Roll3, of the second and third claw normal vectors. The forward rotational arc is determined according to well known geometric principles. In step 606, the processing means sets the forward rotational arc between the second and third claw normal vectors to define a forward parameter cone in accordance with well known geometric principles. In step 608, the processing means determines a center line of the forward parameter cone in accordance with well known geometric principles to yield a forward rotational axis vector. In step 610, the processing means determines a forward intersection point between the forward rotational axis vector and the claw plane 184 of the wheel. The forward intersection point is determined and stored as (Xi2, Yi2, Zi2) in the computer readable storage means of 100. In step 612, the processing means determines a forward runout vector which is expressed relative to the forward rotational axis.

Figure 7A:
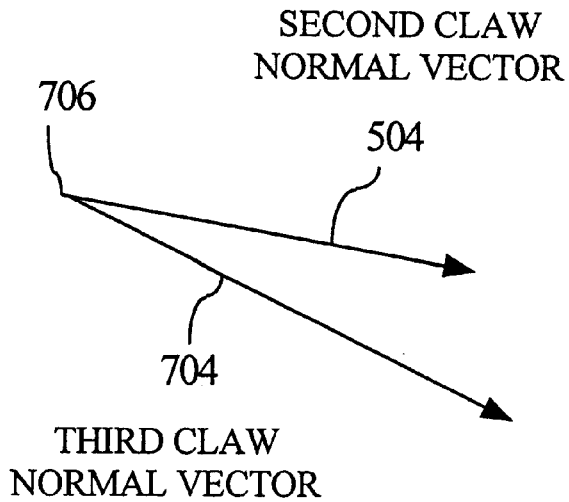
FIGS. 7A through 7D are vector diagrams illustrating the forward parameter determination process illustrated by the flow diagram of FIG. 6.

FIGS. 7A through 7D show vector diagrams illustrating steps for determining the forward runout vector and the forward rotational axis vector in accordance with the forward parameter determination process (FIG. 6). FIG. 7A is a vector diagram illustrating step 602 in which the second claw normal vector 702 is superimposed with the third claw normal vector 704 so that the corresponding second and third claw datum points coincide at a point of coincidence (Xc, Yc, Zc) 706 which is determined according to well known geometric principles.

Figure 7B:
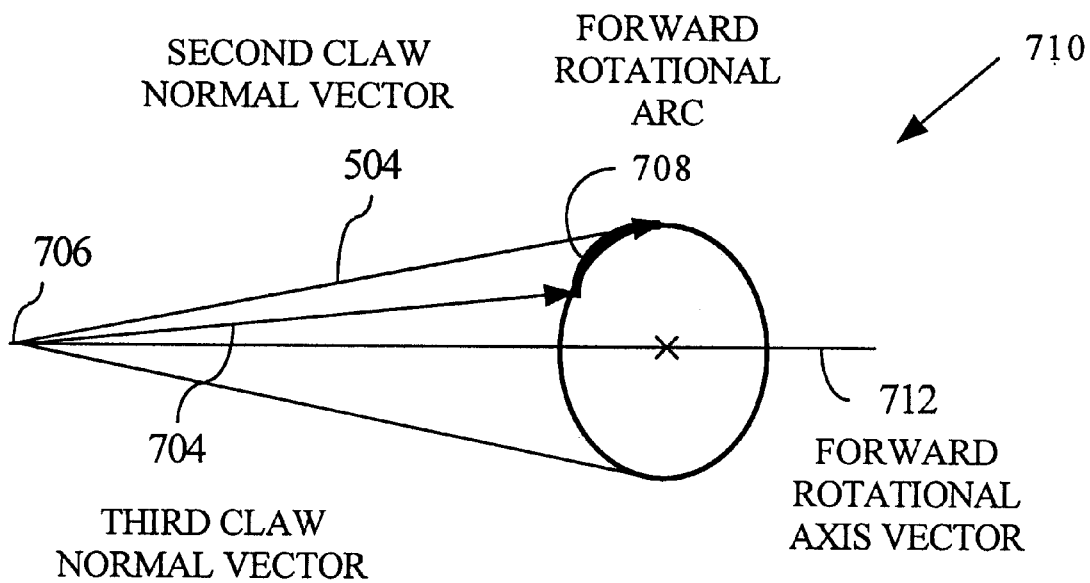

FIG. 7B is a vector diagram illustrating step 604 (FIG. 6) in which a forward rotational arc 708 having an angular length equal to the difference between the roll angles, Roll2 and Roll3, of the second and third claw normal vectors 504 and 704 is determined. In accordance with step 606, the forward rotational arc 708 is set between the second and third claw normal vectors 504 and 704 to define the forward parameter cone 710. In accordance with step 608 (FIG. 6), a center line of cone 710 is determined to yield a forward rotational axis vector 712.

Figure 7C:
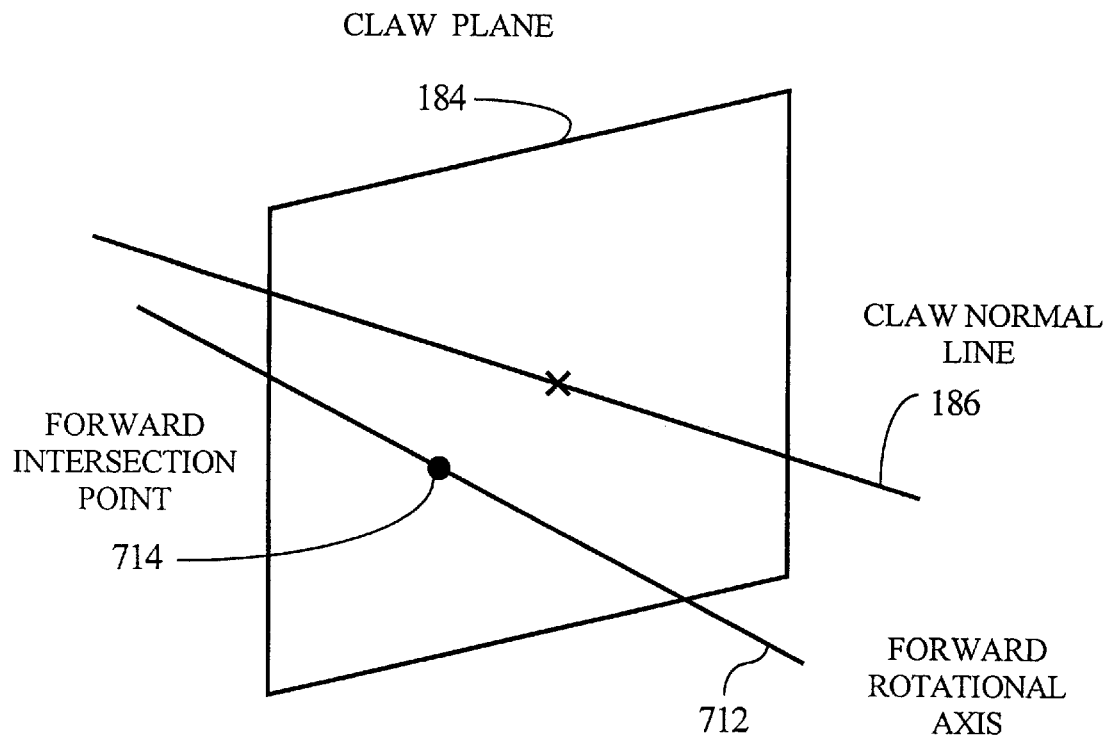

FIG. 7C shows a vector diagram illustrating step 610 in which a forward intersection point 714 between forward rotational axis vector 712 and claw plane 184 is determined. Note that claw plane 184 is not necessarily normal to forward rotational axis 712.

Figure 7D:
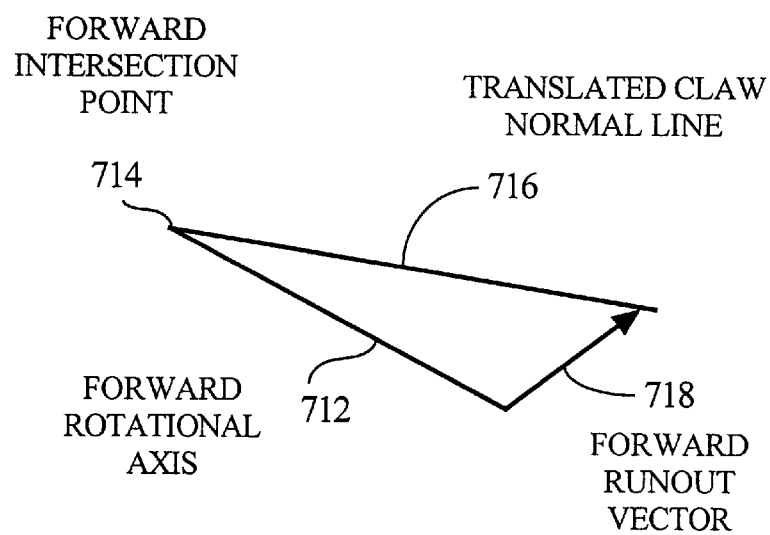

FIG. 7D is a vector diagram illustrating step 610 in which the forward intersection point 714 is used to define a translated claw normal line 716 which intersects the point 714 with a slope that is parallel to claw normal line 186 (FIG. 7C). FIG. 7D also shows a forward runout vector 718 determined in step 612. Forward runout vector 718 is expressed relative to forward rotational axis 712 and the magnitude of vector 718 is set as the angular distance between claw normal line 186 which is parallel to translated claw normal line 716 and forward rotational axis 712. The direction of forward runout vector 718 is expressed relative to the top of the target assembly 105 (FIG. 1E), and thus remains constant regardless of the Roll angle of the wheel.

Note that if the second and third claw normal vectors 504 and 704 (FIG. 7B) are coincident, then they are also identical with forward rotational axis 712. In such case, forward runout vector 718 (FIG. 7D) will have an undefined direction and zero magnitude. Whenever the second and third claw normal vectors 504 and 704 are not identical, then rearward runout vector 718 has a unique non-zero solution.

Figure 8A:
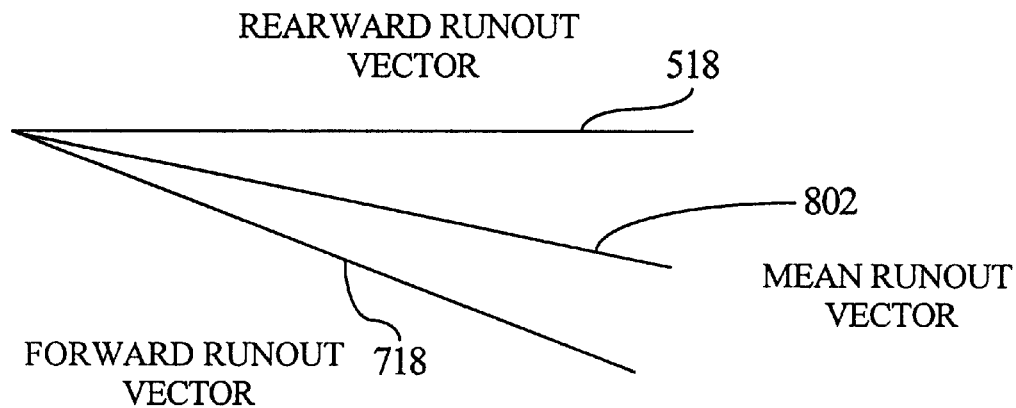
FIG. 8A is a vector diagram illustrating a method for determining a mean runout vector in accordance with the flow diagram of FIG. 2.
Figure 8B:
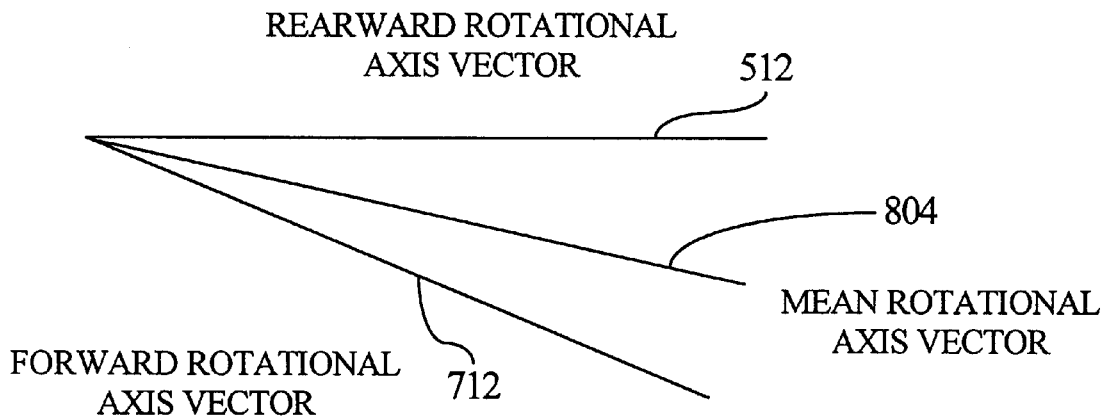
FIG. 8B is a vector diagram illustrating a method for determining a mean rotational axis vector in accordance with the flow diagram of FIG. 2.

FIGS. 8A and 8B are vector diagrams illustrating step 316 (FIG. 3) for determining mean axial geometry. FIG. 8A illustrates a method for determining a mean runout vector 802 in accordance with step 316. The mean runout vector 802 is defined as the mean direction and mean magnitude of forward runout vector 718 and rearward runout vector 518.

Before determining mean runout vector 802, rearward runout vector 518 must be normalized by rotating it around the axis of rotation to the position of forward runout vector 718. The normalization distance is the difference between the angular positions, Roll1 and Roll2, corresponding to first claw normal vector 502 and second claw normal vector 504 (FIG. 5A).

FIG. 8B is a vector diagram illustrating a method for determining a mean rotational axis vector 804 in accordance with step 316 (FIG. 3). The mean rotational axis vector 804 is determined as the mean direction and mean magnitude of rearward rotational axis vector 512 and forward rotational axis vector 712.

Figure 9A:
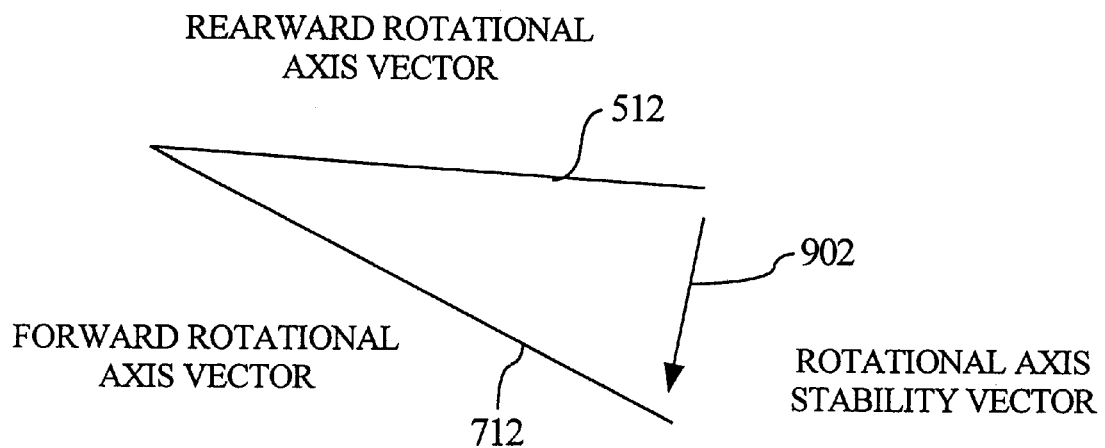
FIGS. 9A and 9B are vector diagrams illustrating a method for determining dynamic stability vectors in accordance with the flow diagram of FIG. 2.
Figure 9B:
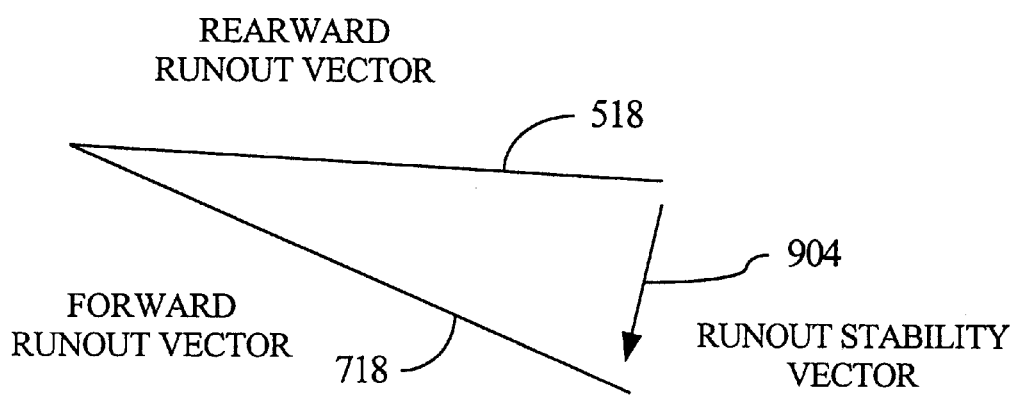

FIGS. 9A and 9B are vector diagrams drawn in accordance with step 318 (FIG. 3) for determining dynamic stability vectors. FIG. 9A illustrates a method for determination of the rotational axis stability vector 902 in accordance with step 318. Vector 902 is determined as the angular differential between forward rotational axis vector 712 and rearward rotational axis vector 512. In the preferred embodiment of the present invention, this difference is expressed as a vector with magnitude and direction referenced relative to rearward rotational axis vector 512 (FIG. 5B). When a wheel is determined to have equal forward and rearward rotational axes, the wheel is determined to be perfectly stable. The greater the deviation between the forward and rearward rotational axes, the greater the stability of the wheel.

The magnitude of rotational axis stability vector 902 indicates the severity of any instability that may exist. The direction of vector 902 provides clues as to the cause of the instability problem. Such problems may include a defective wheel bearing, a defective vehicle suspension system, or a defective steering system. Also, it is possible that erroneous readings can occur due to a loose target assembly. These problems and possible solutions for the problems are further explained below in reference to a spindle diagnostic logic tree which assists an operator in diagnosing the problems indicated by rotational axis stability vector 902 (FIG. 9A).

FIG. 9B is a vector diagram illustrating a method for determining the runout stability vector 904 in accordance with step 318 (FIG. 3). Vector 904 is determined as the angular differential between the forward and rearward runout vectors 518 and 718. In the preferred embodiment, this angular differential is expressed as a vector with magnitude and direction referenced relative to the rearward rotational axis vector 512 (FIG. 5B). Note that in the case where the forward runout vector 718 (FIG. 8) and normalized rearward runout vector 518 are identical, runout stability vector 904 (FIG. 9B) has zero magnitude. In such case, the runout of the wheel is perfectly stable.

A static stability vector can be optionally determined as the differential between the raw claw datum positional and/or claw normal angular measurements at position__1 and position__3. This method of determining a static stability vector requires processing of fewer instructions. However, this method is also less desirable and not preferred because it is more subject to excessive error due to noise.

Figure 10:
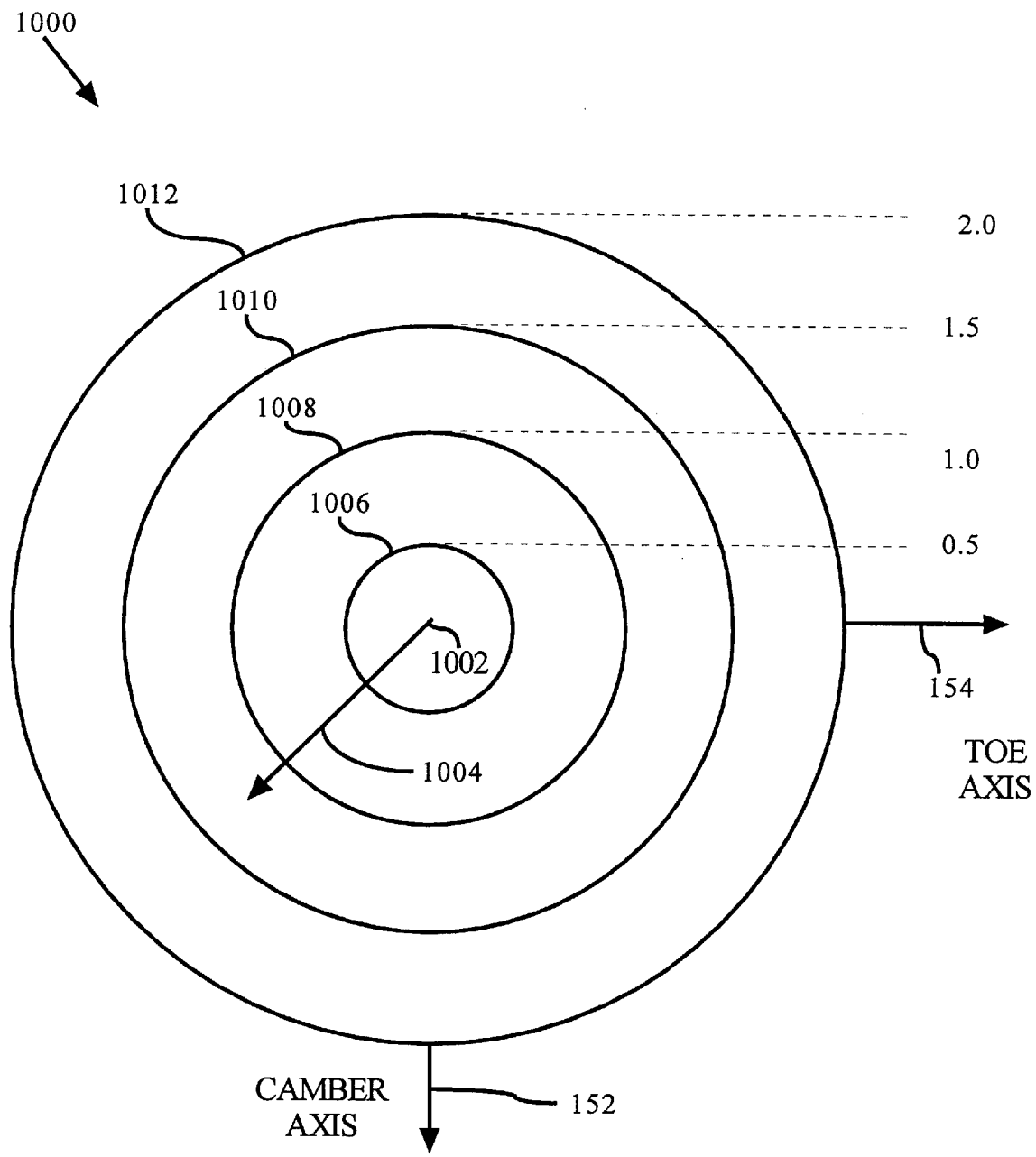
FIG. 10 is a diagram illustrating a display according to the present invention for representing vector magnitude and direction of dynamic stability vectors.

FIG. 10 is a "bulls eye" a diagram illustrating a display 1000 according to the present invention for representing vector magnitude and direction of dynamic stability vectors in accordance with step 320 of the axial stability determination process (FIG. 3).

Display 1000 includes a graph having a coincidence point 1002 at its center. The graph of display 1000 is based on the frame of reference 150 (FIG. 1D) and includes camber axis 152, Toe axis 154, and Roll axis passing through point 1002

(normal to the plane of view). From coincidence point 1002, a display vector 1004 is drawn as it diverges from a true rotational axis. Display vector 1004 may represent rotational axis stability vector 902 (FIG. 9A) or runout stability vector 904 (FIG. 9B).

If the wheel exhibits perfect axial stability (zero axial stability magnitude), display vector 1004 will be represented as a point at coincidence point 1002. Concentric circular boundaries 1006, 1008, 1010, and 1012 define zones of stability. For example, a zone bounded by circular boundaries 1008 and 1012 might represent an "alarm" zone which indicates unacceptable or excessive instability. A zone bounded by circular boundary 1008 and center 1002 might represent an acceptable level of stability. Circular boundary 1008 would thus define a stability alarm threshold value.

The stability alarm threshold value is different for different stability tolerance values defined for various makes and models of vehicles. In this example, boundary 1008 is drawn as a circle with a one degree radius for purposes of clarity. The magnitude of this radius will depend on the specific design of the wheel. Furthermore, some vehicle designs may be specified with an anisotropic stability threshold that has an elliptical or other arbitrarily shaped alarm zone.

Figure 11:
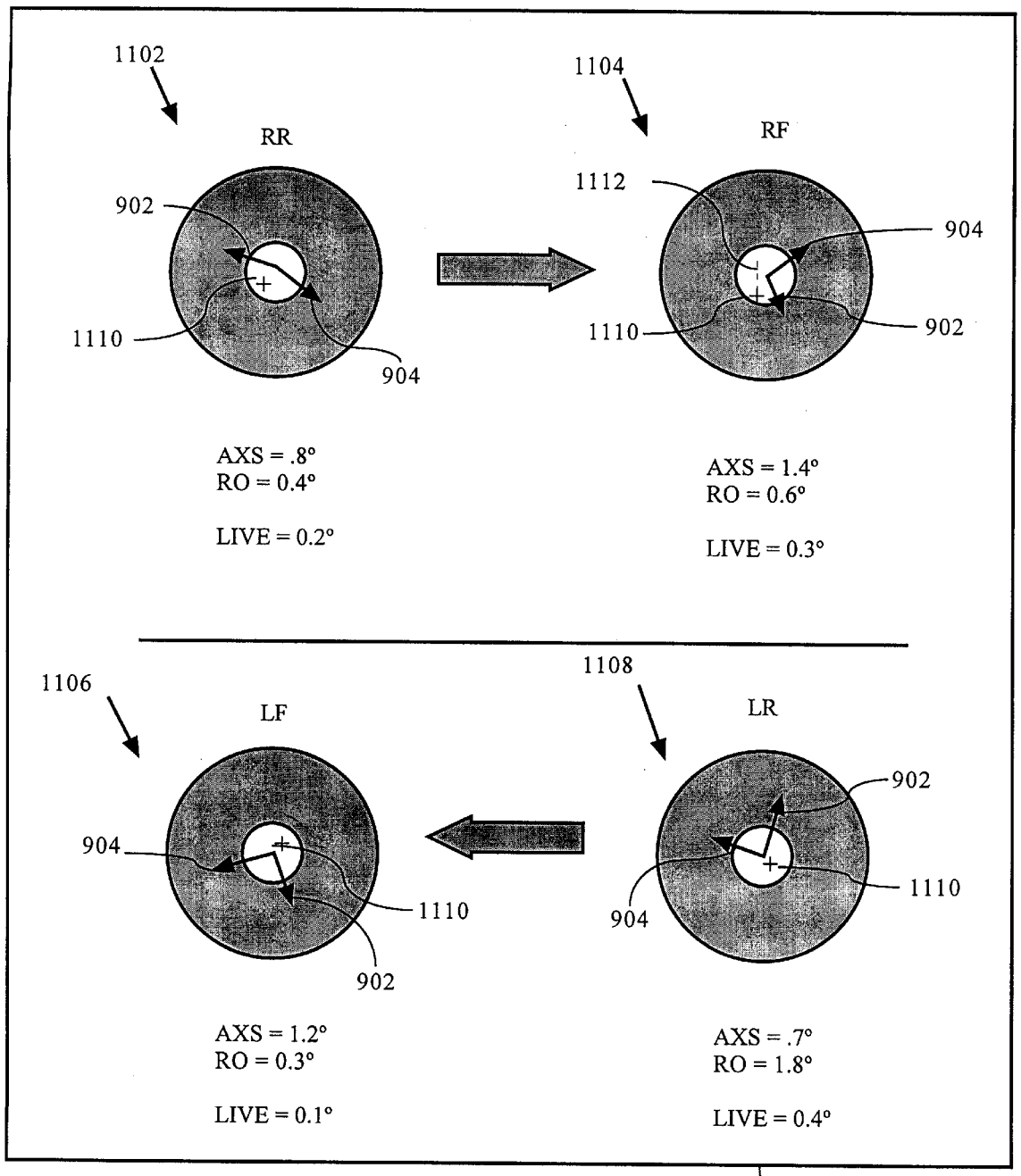
FIG. 11 is a diagram illustrating a display according to the present invention for representing rotational axial stability, wheel runout, and instantaneous "live" positions of four wheels of the vehicle shown in FIG. 1A.

FIG. 11 shows a diagram illustrating a spindle diagnostic display 1100 for representing rotational axis stability vector 902 (FIG. 9A) and runout stability vector 904 (FIG. 9B) in instantaneous "live" positions of four wheels under test of a vehicle.

The purpose of the spindle diagnostic display 1100 is to assist in the detailed diagnosis and subsequent repair of a detected problem. Display 1100 may also be printed for purposes of cost estimation and billing. The display includes four sectors 1102, 1104, 1106, and 1008 as they would appear for a four wheel vehicle. Sector 1102 includes a graph representing parameters of a right rear (RR) wheel of vehicle 102 (FIG. 1A). Sector 1104 includes a graph representing parameters of a right front (RF) wheel. Sector 1106 includes a graph representing parameters of a left front (LF) wheel. Sector 1108 includes a graph representing parameters of a left rear (LR) wheel.

The operator may view instantaneous "live" positions of four wheels under test on display means 1100 (FIG. 1A) while manually forcing a wheel forward, back, up, or down. A position marker 1110 indicates the instantaneous "live" position of each wheel as displayed in each of sectors 1102, 1004, 1106, and 1008 of spindle diagnostic display 1100. A marker trail 1112 is shown on display sector 1104 for the right front (RF) wheel sector under test. Marker trail 1112 (FIG. 11) is rendered in sector 1104 of display 1100 as position marker 1110 moves as the right front (RF) wheel is moved. Marker trail 1112 leaves a visual history of the position of the right front (RF) wheel as it is moved by the operator. This provides a documented indication of the microscopic deviations in angular position so that the operator can manually explore symptoms and positively or negatively validate repairs.

As the operator explores the variability visually, the mechanical play and compliance of the wheel may be simultaneously felt by the operator. When excessive axial stability or runout stability is detected (out of spec for the vehicle) system 100 displays messages to lead the operator through a diagnostic tree to isolate and identify the problem.

Based on the diagnostic tree, the operator can validate and either confirm or eliminate each of several possible sources of instability. For example, the diagnostic tree render text on display means 110 (FIG. 1A) to state;

"WARNING": Axial suspension instability has been detected.
1. Check that the FR target is tight on the wheel. Check turn plates and all equipment.
2. Check for foreign objects on the runway surface.
3. Restart the positioning sequence."

If the problem still persists after eliminating the equipment (non-vehicle) sources the operator can print a diagnostic advice report such as, for example;

"The inspection system has detected excessive axial suspension play on the LR wheel (+/−0.6 degrees, above the tolerance of +/−0.4 degrees). The play is mainly in the Roll axis, indicating possible A-arm wear or damage."

"This exceeds the manufacturers recommended limits."

"This is a potentially dangerous condition that also causes excess tire wear."

"We recommend that this problem be repaired before wheel alignment is performed."

Figure 12:
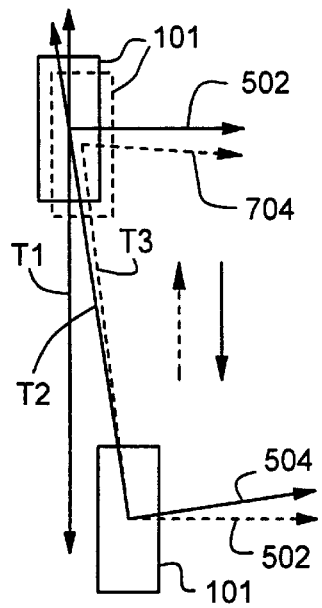
FIG. 12 is a vector diagram illustrating geometric characteristics of a wheel as the vehicle is rolled along an ideal wheel track versus an actual wheel track.

FIGS. 12 through 17 show vector diagrams representing the above-described processes of the present invention in an alternative manner in order to present a more comprehensive view of the several process steps. Specifically, FIG. 12 illustrates the geometric characteristics of a wheel 101 with excessive runout and/or axial instability as the associated vehicle is moved aft and fore so that the wheel 101 is rolled from position_1 to position_2 and then back to a position_3 proximate position 1. A wheel having zero runout and perfect rotational axis stability would move along an ideal wheel track indicated by the double headed arrow T1. In contrast, the illustrated defective wheel moves along skewed wheel tracks T2 and T3 and exhibits a substantial variation between the corresponding first, second, and third claw normal vectors 502, 504, and 704. These vectors are of unity magnitude and have directions in alignment with the respective claw normal lines.

Figure 13:
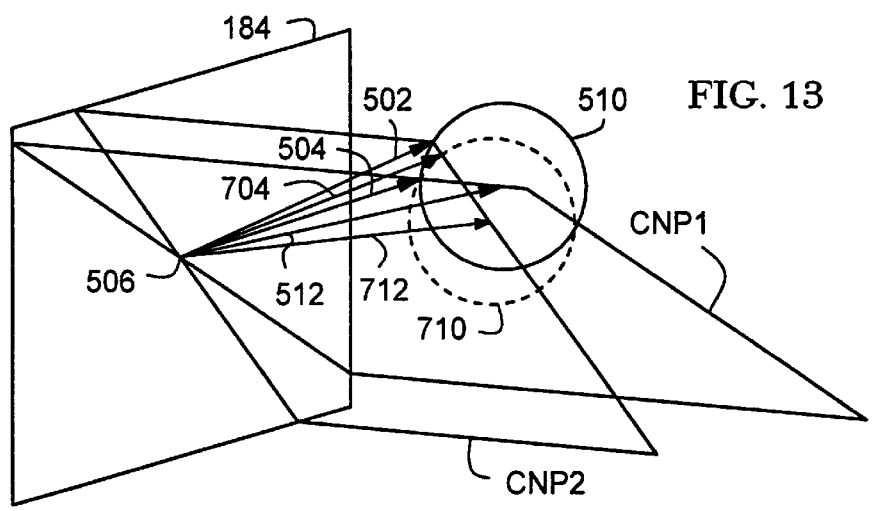
FIG. 13 is a vector diagram illustrating forward and rearward cones transposed into a common space wherein the cones are used for determining the forward and rearward rotational axis vectors.

FIG. 13 is a diagram illustrating the constructed rearward and forward cones 510 and 710, and the computed rearward and forward rotational vectors 512 and 712 respectively transposed into the same space. Also shown are a claw plane 184, a first claw normal plane CNP1 defined by the vectors 504 and 512, and a second claw normal plane CNP2 defined by the vectors 704 and 712.

Figure 14:
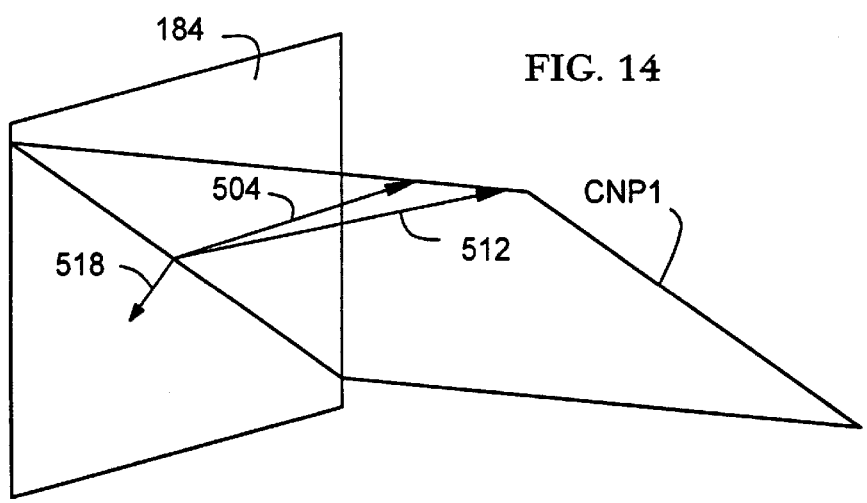
FIG. 14 is a vector diagram illustrating the vector relationship between the rearward runout vector and the rearward rotational axis vector.

FIG. 14 is a diagram illustrating the vector cross product (the rearward runout vector 518) of the translated first claw normal vector 504 and the computed rearward rotational axis vector 512. The rearward runout vector 518 lies within the claw plane 184 and has a magnitude proportional to the vector cross product of the vectors 504 and 512.

Figure 15:
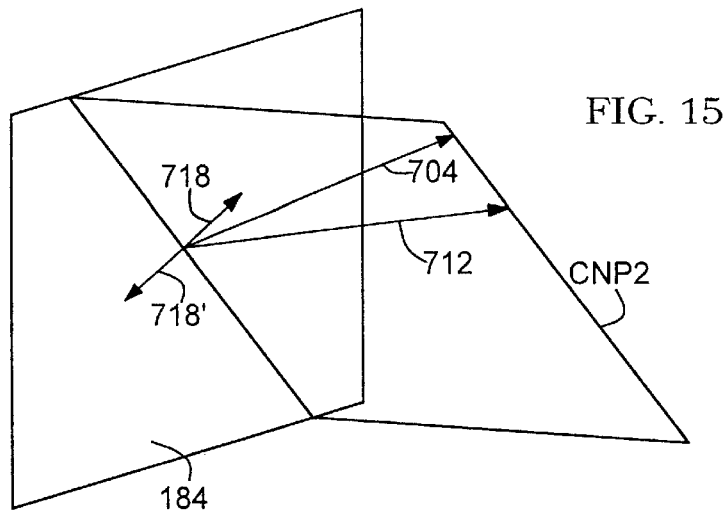
FIG. 15 is a vector diagram illustrating a vector relationship between the forward runout vector and forward rotational axis vector.
Figure 16:
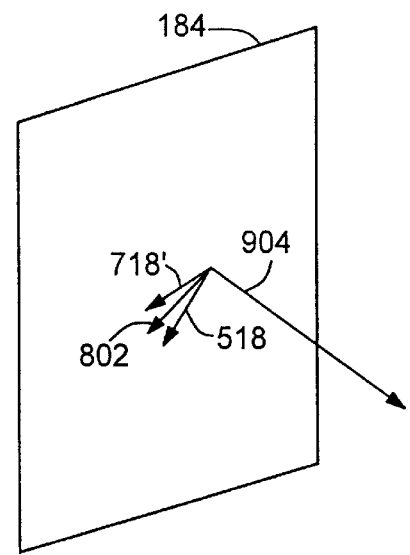
FIG. 16 is a vector diagram illustrating a vector relationship between the mean runout vector and runout stability vector.

FIG. 15 is likewise a diagram illustrating at 18 the vector cross product of the third claw normal vector 704 and the computed forward rotational axis vector 712. The cross product, which yields the forward runout vector 718, also lies within the claw plane 184 but must be rotated 180° to the position 718' so that it can be crossed with the rearward runout vector 518 to yield the runout stability vector 904 as depicted in FIG. 16. Note that the direction of the vector 904 is normal to the vectors 518 and 718' and thus, is also normal to the claw plane 184. FIG. 16 also illustrates the mean runout vector 802, which is the vector sum of the vectors 518' and 718 divided by 2.

Figure 17:
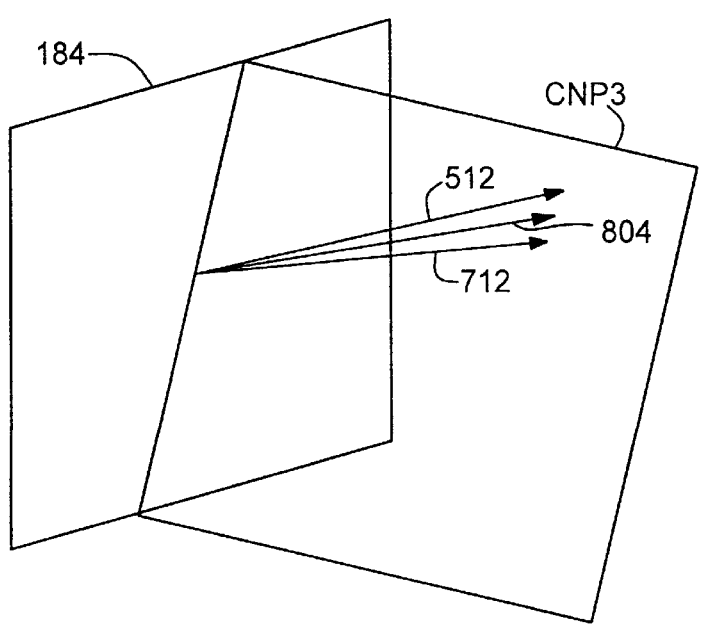
FIG. 17 is a vector diagram illustrating a vector relationship between the rearward rotational axis vector, forward rotational axis vector, mean rotational axis vector, and rotational axis stability vector.

FIG. 17 is a diagram illustrating the vector relationship between the computed rearward rotational axis vector 512 and the computed forward rotational axis vector 712, which when added together and divided by 2 yields the mean rotational axis vector 804. The vectors 512, 712 and 804 may lie in and define a third claw normal plane CNP3.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

We claim:

1. A method for determining an axial stability of a wheel of a motor vehicle, comprising the steps of:
   measuring attitude and location of a wheel with the wheel set in a first position to determine a first vector having a predetermined relation to said wheel;
   rolling said wheel back a number of degrees to a second position and measuring attitude and location thereof to determine a second vector also having said predetermined relation to said wheel;
   determining rearward axis parameters including a rearward rotational axis vector and a rearward runout vector based on said first and second vectors;
   rolling said wheel forward to a third position which is substantially equal to said first position and measuring the attitude and location of said wheel to determine a third vector also having said predetermined relation to said wheel;
   determining forward axis parameters, including a forward rotational axis vector and a forward runout vector, based on said second and third vectors; and
   determining dynamic stability vectors including a rotational axis stability vector and a runout stability vector based on said forward and rearward axis parameters.

2. A method for determining axial stability as recited in claim 1 wherein said step of determining said rearward axis parameters further includes the steps of:
   superimposing said first vector and said second vector so that datum points of said first and second vectors coincide;
   defining an arc having an angular length equal to a difference between roll angles of said first and second vectors;
   setting said arc between said first and second vectors to define a cone; and
   determining a center line of said cone to yield said rearward rotational axis vector.

3. A method for determining axial stability as recited in claim 2 wherein said step of determining said rearward axis parameters further includes the steps of:
   determining a rearward intersection point between said rearward rotational axis vector and a plane which is parallel to a rim plane of the wheel;
   defining a translated normal line which intersects said rearward intersection point with a slope that is parallel to a line which is normal to said plane; and
   determining a rearward runout vector having a magnitude equal to an angular difference between said translated normal line and said rearward rotational axis vector.

4. A method for determining axial stability as recited in claim 1 wherein said step of determining said forward axis parameters includes the steps of:
   superimposing said second vector and said third vector so that datum points of said second and third vectors coincide;
   defining an arc having an angular length equal to a difference between roll angles of said second and third vectors;
   setting said arc between said second and third vectors to define a cone; and
   determining a center line of said cone to yield said forward rotational axis vector.

5. A method for determining axial stability as recited in claim 4 further including the steps of:
   determining a forward intersection point between said forward rotational axis vector and a plane which is parallel to the surface of said target;
   defining a translated normal line which intersects said forward intersection point with a slope that is parallel to a line which is normal to said plane; and
   determining a forward runout vector having a magnitude equal to an angular difference between said translated normal line and said forward rotational axis and having a direction expressed relative to the top of said target.

6. A method for determining axial stability as recited in claim 1 further including the step of determining a mean runout vector based on said rearward runout vector and said forward runout vector.

7. A method for determining axial stability as recited in claim 1 wherein said step of determining said rotational axis stability vector includes the step of determining an angular differential between said forward and rearward rotational axis vectors.

8. A method for determining axial stability as recited in claim 1 wherein said step of determining said runout stability vector includes determining the angular differential between said forward and rearward runout vectors.

9. A method for determining axial stability as recited in claim 1 further including the steps of:
   displaying said dynamic stability vectors graphically on a display means;
   comparing said dynamic stability vectors to specified stability threshold tolerances to determine whether said dynamic stability vectors exceed said specified stability threshold tolerances; and
   provided that said dynamic stability vectors exceed said specified stability threshold tolerances, displaying a spindle diagnostic screen on a display means.

10. A method for determining axial stability as recited in claim 9 wherein said step of displaying said dynamic stability vectors graphically on a display means includes displaying graphical boundaries determined from said specified stability threshold tolerances, said graphical boundaries defining an acceptable zone that represents an acceptable level of rotational stability and an alarm zone that represents an unacceptable level of rotational stability.

11. A method for determining axial stability as recited in claim 9 wherein said step of displaying a spindle diagnostic screen includes displaying, for each wheel, said runout stability vector, said rotational axis stability vector, and current positions of the wheel.

12. A method for determining axial stability as recited in claim 1 wherein said first position and said second position are approximately 30 degrees apart.

13. An apparatus for determining axial stability of a wheel of a vehicle, comprising:
   detection means for measuring attitude and location of said wheel while said wheel is set in a first poistion, a second position displaced rotationally from said first position, and a third position displaced rotationally back to approximately said first position to respectively determine a first vector, a second vector, and a third vector, each said vector having a common predetermined relationship to said wheel;
   processing means for determining dynamic stability vectors, including a wheel runout vector and an axial stability vector of the wheel, based on said measured attitudes and positions of the wheel, said detection means being responsive to said processing means;

storage means for storing predetermined dynamic stability tolerance data for the wheel; and display means for displaying graphical representations of said wheel runout vector and said axial stability vector relative to said tolerance data.

14. An apparatus for determining axial stability as recited in claim 13 wherein said processing means further includes:

means for determining rearward axis parameters including a rearward rotational axis vector and a rearward runout vector based on said first and second vectors;

means for determining forward axis parameters, including a forward rotational axis vector and a forward runout vector, based on said second and third vectors; and means for determining dynamic stability vectors including a rotational axis stability vector and a runout stability vector based on said forward and rearward axis parameters.

15. An apparatus for determining axial stability as recited in claim 14 wherein said means for determining rearward axis parameters further includes:

means for superimposing said first vector and said second vector so that datum points of said first and second vectors coincide;

means for defining an arc having an angular length equal to a difference between roll angles of said first and second vectors;

means for setting said arc between said first and second vectors to define a cone; and means for determining the center line of said cone to yield said rearward rotational axis vector.

16. An apparatus for determining axial stability as recited in claim 15 wherein said means for determining rearward axis parameters further includes:

means for determining a rearward intersection point between said rearward rotational axis vector and a plane which is parallel to the surface of a target;

means for defining a translated normal line which intersects said rearward intersection point with a slope that is parallel to a line which is normal to said plane; and means for determining a rearward runout vector having a magnitude equal to an angular difference between said translated normal line and said rearward rotational axis vector and having a direction expressed relative to the top of a target.

17. An apparatus for determining axial stability as recited in claim 14 wherein said means for determining forward axis parameters further includes:

means for superimposing said second vector and said third vector so that datum points of said second and third vectors coincide;

means for defining an arc having an angular length equal to a difference between roll angles of said second and third vectors;

means for setting said arc between said second and third vectors to define a cone;

means for determining the center line of said cone to yield said forward rotational axis vector.

18. An apparatus for determining axial stability as recited in claim 17 wherein said means for determining forward axis parameters further includes:

means for determining a forward intersection point between said forward rotational axis vector and a plane which is parallel to the surface of a target;

means for defining a translated normal line which intersects said forward intersection point with a slope that is parallel to a line which is normal to said plane; and means for determining a forward runout vector having a magnitude equal to an angular difference between said translated normal line and said forward rotational axis and having a direction expressed relative to the top of said target.

19. An apparatus for determining axial stability as recited in claim 14 further including means for determining a mean runout vector based on said rearward runout vector and said forward runout vector.

20. An apparatus for determining axial stability as recited in claim 14 wherein said means for determining rotational axis stability vector includes means for determining an angular differential between said forward and rearward rotational axis vectors.

21. An apparatus for determining axial stability as recited in claim 14 wherein said means for determining said runout stability vector includes means for determining an angular differential between said forward and rearward runout vectors.

22. An apparatus for determining axial stability as recited in claim 14 further including:

means for displaying said dynamic stability vectors graphically on said display means;

means for comparing said dynamic stability vectors to said predetermined dynamic stability tolerance data to determine whether said dynamic stability vectors exceed specified stability threshold tolerances; and means for displaying a spindle diagnostic screen on said display means if said dynamic stability vectors exceed said specified stability threshold tolerances.

23. An apparatus for determining axial stability as recited in claim 22 wherein said means for displaying said dynamic stability vectors graphically on said display means includes means for displaying graphical boundaries determined from said specified stability threshold tolerances, said graphical boundaries defining an acceptable zone that represents an acceptable level of rotational stability and an alarm zone that represents an unacceptable level of rotational stability.

24. An apparatus for determining axial stability as recited in claim 22 wherein said means for displaying a spindle diagnostic screen includes means for displaying said runout stability vector, said rotational axis stability vector, and current positions of the wheel.

25. An apparatus for determining axial stability as recited in claim 13 and further comprising an actuator means attached to a vehicle supporting means for moving the vehicle back and forth over said vehicle supporting means under control of said processing means from said first position to said second position and to said third position.

26. A method for determining an axial stability of a wheel of a motor vehicle, comprising the steps of:

measuring attitude and location of a wheel with the wheel set in a first position to determine a first vector having a predetermined relation to said wheel;

rolling said wheel a number of degrees to a second position and measuring attitude and location thereof to determine a second vector also having said predetermined relation to said wheel;

determining at least one of first axial parameters based on the first and second vectors;

rolling said wheel to a third position and measuring the attitude and location of said wheel to determine a third vector also having said predetermined relation to said wheel;

determining at least one of second axial parameters based on said second and third vectors; and determining a rotational axis stability vector based on said first and second axial parameters.

27. The method of claim 26 wherein said first and second axial parameters include first and second runout vectors, respectively, and further including the step of determining a runout stability vector based on said first and second runout vectors.

28. An apparatus for determining axial stability of a wheel of a vehicle, comprising:

detection means for measuring attitude and location of said wheel while said wheel is set in a first position, a second position displaced rotationally from said first position, and a third position displaced rotationally from said second position to determine, respectively, a first vector, a second vector, and a third vector, each said vector having a common predetermined relationship to said wheel;

processing means coupled to said detection means and configured for determining an axial stability vector of the wheel;

storage means for storing predetermined dynamic stability tolerance data for the wheel; and display means for displaying graphical representations of said axial stability vector relative to said tolerance data.

29. The apparatus of claim 28 wherein said processing means further determines a wheel runout vector based on said measured attitudes and positions of the wheel.

30. A method for determining axial stability of a wheel of a motor vehicle, comprising the steps of:

measuring attitude and rotary position of a wheel with the wheel in a first location to obtain a first measurement;

rolling the wheel to a second location and measuring wheel attitude and rotary position to obtain a second measurement;

determining at least one of second axial parameters based on the first and second measurements;

rolling the wheel to a third position and measuring wheel attitude and rotary position to obtain a third measurement;

determining at least one of first axial parameters based on the second and third measurements; and determining rotational axis stability based on said first and second axial parameters.

31. The method of claim 30 further including the step of determining runout stability based on said first and second axial parameters.

32. The method of claim 31 further comprising the steps of:

retrieving stored predetermined wheel runout and axial stability tolerance data;

comparing said tolerance data to said determined rotational axis stability and runout stability; and displaying graphical boundaries determined from said tolerance data and superimposing upon said graphical boundaries graphical representations of rotational axis stability and runout stability.

33. An apparatus for determining axial stability of a wheel of a motor vehicle, comprising:

a sensor for measuring attitudes and rotary positions of a wheel in first, second, and third locations, respectively, to obtain first, second and third measurements;

a processor configured for determining an axial stability parameter based on said first, second, and third measurements and for providing axial stability display data; and a display for receiving said display data and providing a visual indication of said axial stability parameter.

34. The apparatus of claim 33 wherein said processor further is configured for determining a wheel runout parameter based on said first, second and third measurements and providing wheel runout display data to said display for presenting a visual indication of said runout parameter.

35. The apparatus of claim 33 wherein said sensor is responsive to said processor for obtaining said first, second, and third measurements.

36. The apparatus of claim 33 further comprising a memory for storing predetermined wheel runout and axial stability tolerance data accessible by said processor, wherein said processor is further configured for using said data for determining relative wheel runout and axial stability parameters.

\* \* \* \* \*